(12) United States Patent
Adam et al.

(10) Patent No.: US 9,046,356 B2
(45) Date of Patent: Jun. 2, 2015

(54) AUTOMATIC OPTIMAL POSITIONING OF SPECTROPHOTOMETER WHILE MEASURING MOVING MEDIA

(71) Applicant: Techkon USA LLC, Danvers, MA (US)

(72) Inventors: George E. Adam, Andover, MA (US); James L. Mourey, Hopkinton, MA (US)

(73) Assignee: Techkon USA LLC, Danvers, MA (US)

( * ) Notice: Subject to any disclaimer, the term of this patent is extended or adjusted under 35 U.S.C. 154(b) by 264 days.

(21) Appl. No.: 13/647,768

(22) Filed: Oct. 9, 2012

(65) Prior Publication Data

US 2013/0088715 A1    Apr. 11, 2013

Related U.S. Application Data

(60) Provisional application No. 61/545,337, filed on Oct. 10, 2011.

(51) Int. Cl.
  *G01J 3/427*    (2006.01)
  *G01B 21/04*    (2006.01)
  *G01J 3/02*    (2006.01)

(52) U.S. Cl.
  CPC .............. *G01B 21/047* (2013.01); *G01J 3/0289* (2013.01); *G01J 3/027* (2013.01)

(58) Field of Classification Search
  USPC ................................................. 356/300–334
  See application file for complete search history.

(56) References Cited

U.S. PATENT DOCUMENTS

| | | | |
|---|---|---|---|
| 4,546,700 A | 10/1985 | Kishner et al. | |
| 6,351,308 B1 | 2/2002 | Mestha | |
| 7,604,984 B2 * | 10/2009 | Frutos et al. | ............... 435/288.7 |

* cited by examiner

*Primary Examiner* — Abdullahi Nur
(74) *Attorney, Agent, or Firm* — Maine Cernota & Rardin

(57) ABSTRACT

A system and method for computer automated optimal lateral alignment of a spectrophotometer over a region of consistent color on a moving media or web for maintaining consistent color and or tonal qualities of a color application production process. The system consisting of a computer operated lateral traverse mechanism affixed to the press or color application equipment that is able to move the sensor laterally in small increments across the band of the color patches on the moving web or media, marking the lateral position each time it makes a light measurement, and therefrom calculating the optimal lateral alignment or position of the sensor for maintaining consistent color or density control during the color application process.

10 Claims, 8 Drawing Sheets

INLINE SPECTROPHOTOMETER INSTALLATION IN A PRINTING PRESS

INLINE SPECTROPHOTOMETER INSTALLATION IN A PRINTING PRESS

FLOW CHART

FLOW CHART

SIMPLIFIED CONFIGURATION

CONTROL ALGORITHM EXECUTION ON HOST COMPUTER

CONTROL ALGORITHM EXECUTION ON INTELLIGENT SPECTROPHOTOMETER

PATCH AND APERTURE - NOT TO SCALE

AUTOMATIC OPTIMAL POSITIONING OF SPECTROPHOTOMETER WHILE MEASURING MOVING MEDIA

RELATED APPLICATION

This application claims the benefit of U.S. Provisional Application No. 61/545,337 filed Oct. 10, 2011, incorporated herein by reference in its entirety for all purposes.

FIELD OF THE INVENTION

The invention relates to the positioning of spectrophotometers for measuring reflected light and/or brightness of moving media for maintaining consistent color hue and density in production color applications operations, and more particularly to a method and apparatus for automated lateral alignment of a sensor head for optimal positioning over a known region of consistent color on the media surface.

BACKGROUND OF THE INVENTION

Spectrophotometers measure reflected light intensity at selected wavelengths. They are widely used in graphic arts and similar applications to ensure uniform color hue and density of printed material, paints, dyed fabric, and other applications where ink, paint, dye, or other coloring material is applied to paper, plastic, fabric, walls or other surfaces or materials. Standardized measurement of light reflectance at different wavelengths allows printing pressmen and other equipment operators to adjust a printing press, color copier, or other colorant application device or system so as to obtain uniform, consistent color hue and density of applied colorant material. In some systems the measurements of light reflectance are used to adjust printing and other color application systems semi-automatically or automatically.

To assist in making standardized measurements, printed material typically has color regions of different hues to act as reference color samples. Typically these are printed in the material margins. Color printing device or printing press may print color sheets that contain color patches or stripes. The color regions can be measured by a spectrophotometer or other device for color hue and density measurement. Numerous spectrophotometers and systems exist for measuring reflected light color and brightness from these patches or from other parts of the printed material. However existing spectrophotometers and systems have limitations.

Hand-held, single-measurement spectrophotometers exist that are accurate, easy-to-use, and relatively inexpensive. However they only make a single measurement at a time, and typically a printed color sheet of paper must be removed from a sheet fed press, or the printing press stopped for a web fed press, to make measurements. After the operator makes a change to the printing press to optimize color hue and density, the press may need to be re-started and another measurement made to determine if the printed output is now acceptable. This is a tedious and time-consuming process which leads to higher costs for printing companies.

Spectrophotometer scanners exist with an additional "look-ahead" sensor or sensor array that aligns the spectrophotometer with color patches. These sensors add cost and complexity to the system because of the added sensor and its support hardware (and possibly software). The look-ahead sensor must be carefully aligned with the spectrophotometer, both mechanically and in time, to ensure that spectrophotometer alignment tracks sensor alignment, and periodically checked to ensure that alignment remains valid. Again this adds cost to the printing process for printing companies.

Spectrophotometer scanners further exist that move the measuring device in two axes, facilitating the measurement of stationary samples. These devices are more complex and they solve the more complex case of a target that may be angularly misaligned with the scanner. In solving that, the system must make multiple scans across the length of the measured sample, and compute a best multi axis trajectory for future sample measurements. If the media is moving, the measured artifacts typically remain aligned with the direction of motion, so motion across the media is not necessary, and all steps required to estimate angular error are not providing additional value.

In-line spectrophotometer systems also exist that use a video camera as a sensor to align the in-line spectrophotometer with the color regions so as to measure the color regions printed on the sheet. In some cases, these systems automatically adjust the printing press or other device to optimize color hue and density. Again, these systems are complex, very expensive, and typically require periodic maintenance and calibration for continued proper function.

Automated systems exist that use a color video camera to take a real-time picture of the printed material, including color patches, to determine printed color hue and density. In some cases, these systems automatically adjust the printing press or other device to optimize color hue and density. However, these systems are complex, very expensive, and typically require periodic maintenance and calibration for continued proper function. They are also limited by the performance of the color video camera and its illumination system for consistent and uniform color measurement.

A semi-automated spectrophotometer can be mounted on a printing press and that measures color patch hue and density in real-time as printed material passes underneath the spectrophotometer. The system uses proprietary pattern recognition software to detect the patches passing longitudinally under the spectrophotometer, and automatically detects and measures each color patch as it goes by. However, the lateral position of the spectrophotometer must be adjusted to align with the position of the color patches on the printed material. This can be very difficult for smaller patch sizes.

What is needed is a system and method that improves the performance of spectrophotometer devices for real-time measurement of color hue and density by automating the process of laterally centering the spectrophotometer over the reference color regions in the measurement system.

SUMMARY OF THE INVENTION

Embodiments of the invention include a method for computer automated optimal lateral alignment of a spectrophotometer over calibration regions on printed materials of a moving web press for maintaining consistent qualities of a color application process comprising the steps of moving a traverse arm in an initial first direction; reporting, with the spectrophotometer, representative spectral data from specific regions of interest; converting spectral data to at least one metric; storing, with position data, the at least one metric; moving the traverse arm in a direction opposite the first direction by 1/N width of the patch; applying mathematic interpolation to convert 2N+1 values for the metric and the position to 20N+1 metric values that are equally spaced across a range of the measured positions; finding an attribute of the metric and corresponding the position; moving the traverse arm to the position of the attribute of the metric. Another embodiment comprises manually adjusting the spectrophotometer on a lateral traverse system to be approximately over the regions in a margin of the printed materials. A further embodiment comprises, at a system start-up, a controller commanding the traverse arm to scan the spectrophotometer laterally across an entire width of the web press until the region is located at a point of maximum metric; and positioning the spectrophotometer at the location. Other embodiments comprise a control algorithm operating on a host or on the spectrophotometer. In continuing embodiments, N=5. Yet other embodiments provide that the attribute comprises a center of the region of interest determined by finding a peak metric value in the interpolated data set. In ongoing embodiments, the attribute comprises a center of the region of interest determined by finding a center point between two shoulders in the interpolated data set. Subsequent embodiments include that an initial position is estimated by a predicted position of a location of a region in a printed image.

Another embodiment of the invention includes a computer operated system for automated alignment of a spectrophotometer over a region of consistent color on printed materials on a moving web in a color application process comprising a lateral traverse system configured to move the spectrophotometer laterally across the moving web; a computer configured to command movements by the lateral traverse system of the spectrophotometer over the moving web while scanning, and to correlate scanned light measurements with a respective lateral position at a time of the measurement; and an algorithm configured to use the light measurements and the lateral position information to calculate an optimal position for the spectrophotometer. Embodiments provide that the region comprises a segmented band of color or monochrome forming patches; and the region comprises a continuous band of color or monochrome forming a stripe. In other embodiments, communication between the spectrophotometer and the traverse system comprises an RS485 cable; and communication between the spectrophotometer and the computer comprises a CAT5 cable. Continuing embodiments include that the algorithm comprises a spline algorithm; and that the algorithm comprises a piecewise linear interpolation algorithm. For further embodiments, the algorithm executes on the spectrophotometer; and the algorithm executes on the computer. In another embodiment, the alignment is repeated at intervals corresponding to variability of location of the regions.

Yet another embodiment of the invention includes a method for automatic lateral self alignment of a spectrophotometer over a color patch on a medium on a web-press comprising the steps of receiving, at the spectrophotometer, a self-align command; the spectrophotometer consequently sending a command to a traverse arm, whereby the spectrophotometer moves a distance of a width of the color patch laterally in a first direction at at least about 300 mm/second; requesting, by the spectrophotometer, a current lateral position of the traverse arm; storing the position as a digital value; turning on, by the spectrophotometer, a lamp of the spectrophotometer; starting a lamp timer; waiting for the lamp to warm up; turning on, by the spectrophotometer, light reflectance data acquisition; taking, by the spectrophotometer, a series of discrete measurements, each of a duration equivalent to a time it takes a single page of the color patches to pass under the spectrophotometer; after each measurement finishes, the spectral data is converted to a list of density values; searching the list for a maximum density; storing the density values with current the position of the traverse arm; if eleven density values have been stored, the spectrophotometer moves the traverse arm laterally in a direction opposite the first direction at least about 300 mm/s by about ⅕ a width of the patch; repeating the measurements until a total of eleven measurements have been taken, each associated with a traverse arm position precision of about 0.1 mm; turning off the light reflectance data acquisition; turning off the lamp; interpolating the data using a cubic spline algorithm to generate data of higher precision; searching the data points for a maximum density value and a position associated with the maximum value and designating the position a best lateral position for the spectrophotometer; associating the best lateral position with a center position of multiple adjacent points if the multiple adjacent points have about a same maximum density value; sending, by the spectrophotometer, the traverse arm a command to move to the best lateral position at a speed of greater than about 300 mm/s; whereby the spectrophotometer is laterally positioned such that its aperture is optimally aligned with the color patches; repeating the self alignment process about every 10 minutes, so as to maintain alignment of the spectrophotometer with the color patches.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

This invention improves the performance of spectrophotometer devices for real-time measurement of color hue and density by automating the process of laterally centering the spectrophotometer over the reference color regions in the measurement system. An economic advantage of this new technique over other systems is that it does not require the addition of costly hardware, such as a digital camera or other vision system to locate the color regions and center the spectrometer over them.

Figure 1:
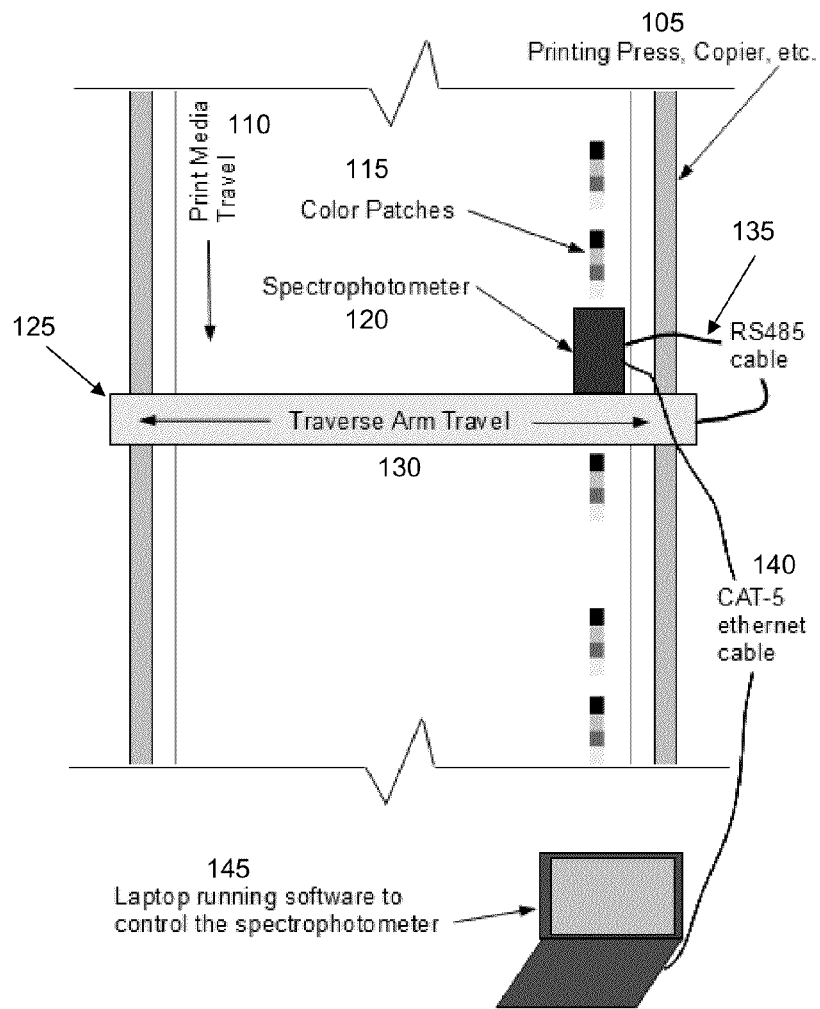
FIG. 1 is a diagrammatic depiction of a spectrophotometer installation in a printing press configured in accordance with an embodiment.

FIG. 1 is a diagrammatic depiction 100 of an embodiment of the invention of a spectrophotometer installation in a printing press. Printing press, copier, etc. 105 comprises print media traveling linearly 110. Print media comprises color regions 115. Spectrophotometer 120 is affixed to traverse arm 125. Travel along traverse arm 125 is transverse 130 across print media. In embodiments, spectrophotometer 120 comprises connection 135 to traverse arm 125, and connection 140 to computer 145 running software to control spectrophotometer 120. For embodiments, connection 135 comprises an RS485 cable, and connection 140 comprises Ethernet cable, a nonlimiting example being CAT-5. In embodiments, alignment algorithms are executed on an intelligent spectrophotometer.

Embodiments comprise controller based automatic adjustment of the lateral position of a spectrophotometer or other optical measurement system so as to automatically optimize in real-time the position of the measurement system over a series of color regions on printed or reproduced material. This series of color regions comprise specific regions of interest. Other specific regions of interest comprise color patches, bars, and bands of density patches.

Embodiments ensure that the "Y" coordinate is appropriate, so that similar measured regions are used in the computation. A simple case would be a striped pattern such as gravure wallpaper. Since that pattern is continuous in the Y (web travel) dimension, measurements at any Y position would be appropriate for use by embodiments of the algorithm. An example of segmented patterns is color bars with image surround. Applications require identification of the appropriate color bar for measurement. Furthermore, improved results can be obtained when the same region within the color bar is measured by the algorithm. Some spectrophotometers, such as the ES5000, scan in the Y axis, producing thousands of measured samples, and then use a variety of techniques to locate regions of interest within the scanned dataset. In some embodiments, those regions are located based on patterns of color within the data. Alternately, external signal lines are monitored to identify the Y position of measured samples, which is, in turn, used to report only data within selected regions. Finally, a combination of both can be used to further improve Y position accuracy when the external signals are approximate. Other spectrophotometers may provide instantaneous "snap shot" measurements that are triggered by external signals to assure that the appropriate Y position is measured. Other methods may be used as long as the measured data has a Y position that provides data that is representative of the region to be aligned. As mentioned earlier, a region that is a continuous stripe allows any Y position to be used.

Operation of embodiments comprises a spectrophotometer system such as the Techkon SpectroEdge ES5000 mounted on a printing press or other reproduction system so that the printed or reproduced material passes under the spectrophotometer at a distance such as 3+/−0.5 mm. In addition to its optics, light source, color filters, and light sensors, embodiments of the spectrophotometer contain an application programming interface (API) which allows it to be controlled by a control subsystem, such as a personal computer. The spectrophotometer is mounted on a lateral traverse that allows it to travel across the width of the printed material. In embodiments, the position of the spectrophotometer on the traverse mechanism is adjusted using a motorized lead-screw, linear motor, hydraulic or pneumatic actuator, or other positioning device under the control of the control subsystem.

While the printing press is stopped, in embodiments, the user performs a manual rough alignment of the spectrophotometer such that its aperture is aimed approximately over the reference color regions at the center of a color region in the margin of the printed material. In embodiments, about half of a region width is considered approximate. This involves using a slider control in the software user-interface, running on a PC (e.g. laptop), to move the instrument horizontally across the press's print media and "eye-balling" the position of the instrument relative to a column of color regions printed along the edge of the printed sheet.

In embodiments, the initialization process at system start-up comprises the controller commanding the traverse assembly to scan laterally across the entire width of the press until it finds the color regions, locates the point of maximum spectrophotometer signal, and positions the spectrophotometer at that location. This is an alternate method when no X estimate has been provided.

In other embodiments, a press operator has knowledge of the image currently being printed, a predicted position. Within that image, the color bar, for example, might be 100 mm from the right edge of the web. The press currently has a paper web located 200 mm off the right edge of the press rollers. The edge of the press roller corresponds to the transport arm "zero" location. In this case, the press operator moves the transport arm to 300 mm, and begins the optimization algorithm. This differs from the "eyeball" approach and the "scan the entire press width" approach. Here, the operator has a reasonably good idea of where the color bar should be found, but there is some uncertainty, which the algorithm resolves so that the spectrophotometer is ideally positioned.

Next, the printing press or other color imprinting system is turned on and the printing process begun with the print media traveling at any speed in the range of 500 to 5,000 mm/sec and beyond. As an example, a gravure press may run at 16,000 mm/sec. (Once up to print speed, typical press speed fluctuation has no adverse effect on this method). Once the press is running, the user sends a "self-align" command to the instrument, via the software user-interface, to the spectrophotometer system to automatically optimize its lateral position. The spectrophotometer system commands the lateral traverse system to move the spectrophotometer an initial small distance, such as 5 mm, in a first direction, so that it is no longer centered over the color regions.

The spectrophotometer control subsystem commands the lateral traverse system to move the spectrophotometer at a controlled rate across the color regions so that the spectrophotometer scans across the color regions as they are moving. The spectrophotometer makes measurements of reflected light during the traverse, and records the position of the traverse assembly at each measured location. On completion of the scan, the spectrophotometer uses an algorithm to best position the lateral traverse system to cause the spectrophotometer to measure in the center of the color region. The spectrophotometer system communicates to the lateral traverse system to move the read head to the best position, which completes the self-alignment process.

The controller then, in embodiments, commands the system, at a time interval selected by the operator, or in response to other manual or automated recalibration queues, to continually repeat the process of optimizing the lateral position of the spectrophotometer. Thus, if the position of the color regions varies, as can happen during the printing process, the control system will re-establish the spectrophotometer position for optimum performance.

Figure 2:
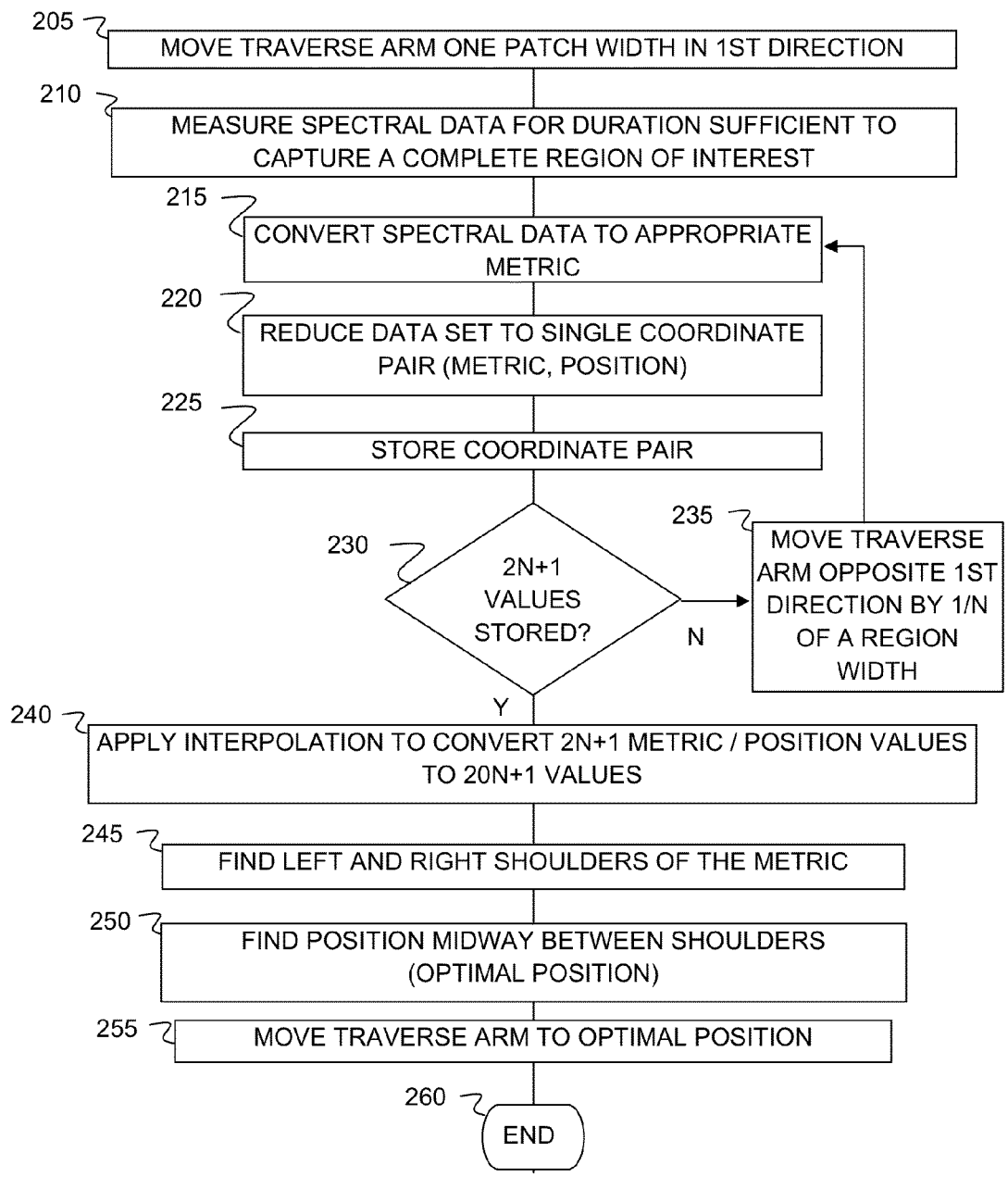
FIG. 2 is a first flow chart illustrating the self alignment process configured in accordance with an embodiment.

FIG. 2 is a flow chart 200 of one embodiment of the invention method illustrating the self-alignment process describing finding the center of a region based on shoulders. Embodiments perform best for normal to wide patches. When the spectrophotometer receives the "self-align" command, it sends a command, such as via an RS485 signal, to the traverse arm, to move it a (small, one patch width) distance equivalent to the region width (for example), laterally to the right of its current position, quickly (>=300 mm/sec) 205.

The spectrophotometer requests the current lateral position of the traverse arm and stores it as a digital value, such as "traverseStart_mm".

The spectrophotometer takes a series of discrete measurements 210, each of a duration equivalent to the time it takes a single form (or "page") of the printed regions to pass under the spectrophotometer. In embodiments, representative spectral data is spectral data that represents the specific region of interest.

After each measurement finishes, the spectral data is converted to a list of appropriate metric values, depending on the print media color and the ink color(s) 215. For saturated inks, such as cyan, magenta, yellow, and black, an appropriate metric could is density in embodiments. For reflective ink, such as white on a black or metallic substrate, then lightness is appropriate in embodiments. For embodiments, the list is searched for a maximum 220 and is stored along with the current position of the traverse arm 225. In some embodiments, maintaining consistent qualities of a color application process comprise color qualities, or tonal qualities, or both color qualities and tonal qualities.

The spectrophotometer moves the traverse arm laterally (for example) to the left, quickly, (>=300 mm/s) by a small distance, such as 1/5 of a region width 235. For embodiments, the general form is that the movement is 1/N region widths. In this embodiment, N=5. For embodiments, five produces surprisingly good results. This sequence of taking a measurement and moving the traverse arm by a small distance repeats until a total of 2N+1 measurements have been taken, each associated with a precise traverse arm position (precision <=0.1 mm) 230. So in this example, 11 measurements are made.

At this point, using N=5, the spectrophotometer has 11 data points, each representing a pair of position/metric values. These data points are interpolated using an interpolation algorithm, such as a cubic spline, to generate data with higher X dimension resolution 240.

A "shoulder" threshold is defined as some percentage of the maximum which is less than 100%, such as 75%. In embodiments, the metric will have dropped by 25% as the aperture moves off the region and starts to also measure some of the area outside the region.

The data points are searched in order of position value, starting from the position of maximum metric and decreasing until the metric value drops below the "shoulder" threshold. This position represents the "left shoulder" 245. The data points are searched in order of position value, starting from the position of maximum metric and increasing until the metric value drops below the "shoulder" threshold. This position represents the "right shoulder" 245.

The position value that is midway between the "left shoulder" and "right shoulder" positions is considered the best lateral (optimal) position of the spectrophotometer "bestPos_mm" 250.

If, after trying to detect the left and right shoulders, only one shoulder is found, an edge detection algorithm is applied to accurately associate the one shoulder position with the actual edge of the printed region. Then, knowing the width of the region, the second shoulder position is calculated. With both shoulder positions calculated, the midway position is determined and associated with "bestPos_mm". In embodiments, this condition may occur if the original position was at the far edge of a patch or possibly even slightly off the patch.

The spectrophotometer then sends the traverse arm a command to move to position "bestPos_mm" quickly (>=300 mm/s) 255, ending the sequence 260.

Figure 3:
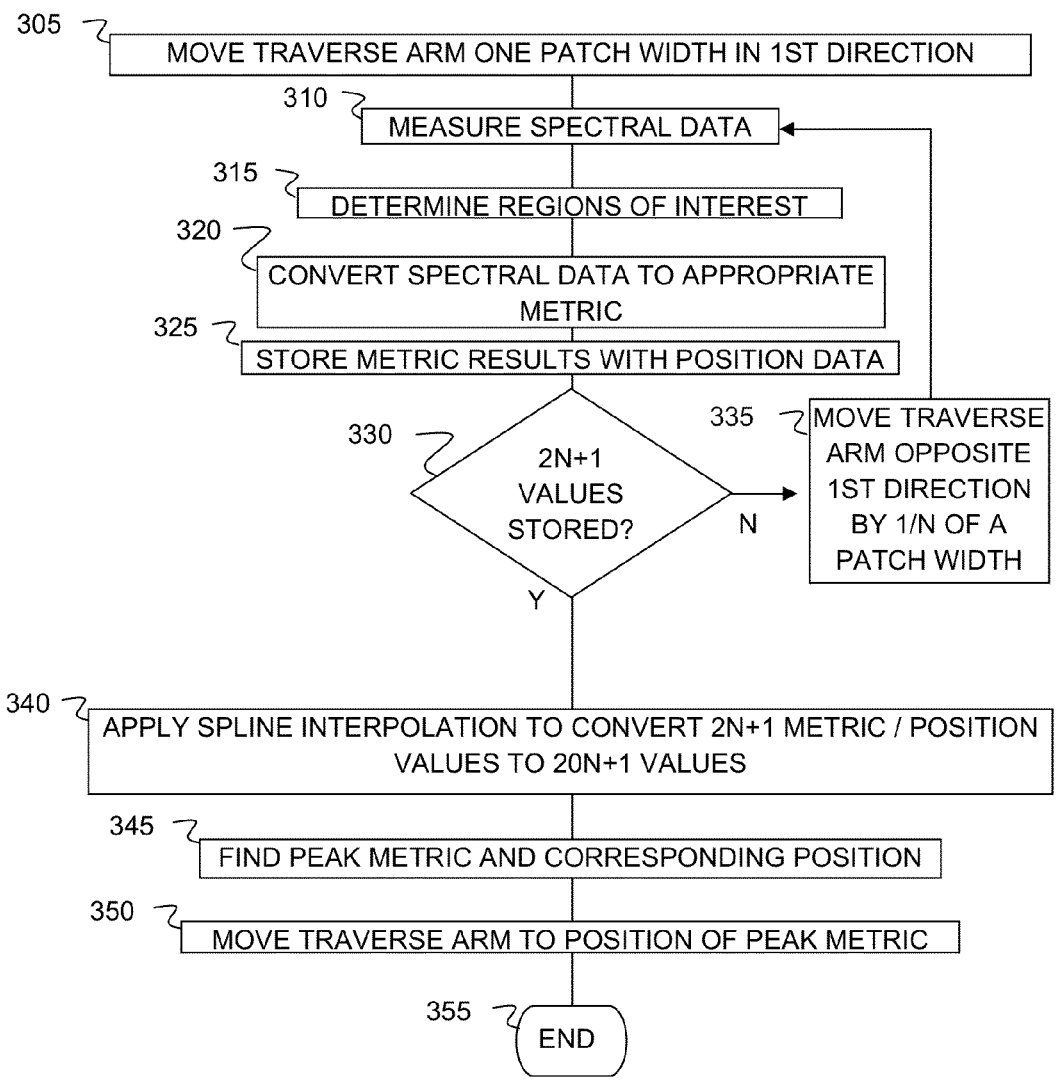
FIG. 3 is a second flow chart illustrating the self alignment process configured in accordance with an embodiment.

FIG. 3 illustrates a self-alignment method flowchart embodiment 300 describing finding a center based on peak. Embodiments are faster, working well for narrow patches. The traverse arm is moved a small distance (one patch width) in an initial first direction 305. The spectrophotometer measures spectral data 310. Regions of interest art determined 315. Spectral data is converted to an appropriate metric(s) 320. Metric results are stored with position data 325. If 2N+1 values have been stored 330, step 340 is next. If not, the traverse arm is moved in the direction opposite the first direction by 1/N of a patch width 335. An interpolation algorithm is applied, such as a cubic spline, to convert 2N+1 values for metric/position to 20N+1 values 340. The peak of the metric and corresponding position are then found 345. The traverse arm is moved to the position of the peak metric 350, ending the sequence 355. For embodiments, this algorithm is more efficient, but may not determine the optimal X position for reading. When the patch is only slightly wider than the aperture, this algorithm provides good performance.

For embodiments, the spectrophotometer measures metrics that characterize visual attributes of the patch. A nonlimiting example of a metric is density. Under particular conditions optical Density is used. Optical density, or sometimes referred to simply as Density, relates to the absorbance of the ink or paint applied to a surface. Density is computed according to the formula: Density=−log(Reflectance) where reflectance is on the range [0, 1]. In other conditions L* or Y are used to find a white stripe on a black surround. L* and Y are metrics that increase with increasing Reflectance, so are appropriate for finding a maxima within the region when the region is of higher Reflectance than the surround. Such conditions include putting a white opacifying stripe on a silver Mylar film prior to printing on it. The silver measures as black, and the stripe measures as white.

Embodiments comprise a determine region of interest step. In embodiments, all measured regions are of interest. For example, when looking for maxima when all surrounding regions that are well below that maxima.

As mentioned, for embodiments, N has a value of 5. For tested embodiments, N=5 provided good results. In embodiments, lower values for N can be used to increase speed as the process would require fewer discrete measurements, and higher values can provide better accuracy because more measurements depend less on interpolation to achieve high resolution data along the X-axis.

For embodiments, FIG. 2, step 205 shows the traverse arm being moved 1 patch width in the first direction. If the initial alignment to the patch has significant uncertainty (as multiple patch widths), the traverse arm may be moved some multiple of patch widths so that the algorithm is more likely to find the patch edges. To accommodate this, the number of steps will have to be increased so that the entire patch will be measured in the process.

Tests were run using prototype equipment; results are shown in Tables 1-10. The prototype employed a drum with a circumference of 635 mm which, for this test, is equivalent to "page length". For printed color patches, an image of a food product package was used which contains a series of color bars, each containing 13 patches (5 mm wide×10 mm high). For each trial in the test, the drum was run at different speeds starting at 500 mm/s for trial #1 and ending at 5,000 mm/s for trial #10. Within each trial, the traverse arm was set to a series of different "start" positions and then the spectrophotometer was sent the "auto-align" command. The "end pos" column shows the result of each auto-alignment. The results remained consistent (+/−0.1 mm) over the various drum speeds and start positions.

TABLE 1

TABLE 1 TRIAL# 1

| | Scan # | Start Pos. (mm) | End Pos. (mm) | Remarks |
|---|---|---|---|---|
| Patch Width (mm): 5 | 1 | 152 | 156.3 | Takes 28.9 sec. |
| Patch Ht. (mm): 10 | 2 | 153 | 156.4 | |
| Num. Patches: 13 | 3 | 154 | 156.4 | |
| Speed (mm/s): 500 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.4 | |
| | 10 | 161 | 156.4 | |
| | Std. Dev | | 0.0316 | |

TABLE 2

TABLE 2 TRIAL# 2

| | Scan # | Start Pos. (mm) | End Pos. (mm) | Remarks |
|---|---|---|---|---|
| Patch Width (mm): 5 | 1 | 152 | 156.3 | Takes 15.7 sec. |
| Patch Ht. (mm): 10 | 2 | 153 | 156.4 | |
| Num. Patches: 13 | 3 | 154 | 156.4 | |
| Speed (mm/s): 1000 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.4 | |
| | 10 | 161 | 156.3 | |
| | Std. Dev | | 0.0422 | |

TABLE 3

TABLE 3 TRIAL# 3

| | Scan # | Start Pos. (mm) | End Pos. (mm) | Remarks |
|---|---|---|---|---|
| Patch Width (mm): 5 | 1 | 152 | 156.3 | Takes 11.2 sec. |
| Patch Ht. (mm): 10 | 2 | 153 | 156.4 | |
| Num. Patches: 13 | 3 | 154 | 156.4 | |
| Speed (mm/s): 1500 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.3 | |
| | 10 | 161 | 156.3 | |
| | Std. Dev | | 0.0483 | |

TABLE 4

TABLE 4 TRIAL# 4

| | Scan # | Start Pos. (mm) | End Pos. (mm) | Remarks |
|---|---|---|---|---|
| Patch Width (mm): 5 | 1 | 152 | 156.3 | Takes 9.1 sec. |
| Patch Ht. (mm): 10 | 2 | 153 | 156.4 | |
| Num. Patches: 13 | 3 | 154 | 156.4 | |
| Speed (mm/s): 2000 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.4 | |
| | 10 | 161 | 156.3 | |
| | Std. Dev | | 0.0422 | |

TABLE 5

TABLE 5 TRIAL# 5

| | Scan # | Start Pos. (mm) | End Pos. (mm) | Remarks |
|---|---|---|---|---|
| Patch Width (mm): 5 | 1 | 152 | 156.3 | Takes 7.8 sec. |
| Patch Ht. (mm): 10 | 2 | 153 | 156.3 | |
| Num. Patches: 13 | 3 | 154 | 156.4 | |
| Speed (mm/s): 2500 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.3 | |
| | 10 | 161 | 156.2 | |
| | Std. Dev | | 0.0707 | |

TABLE 6

TABLE 6 TRIAL# 6

| | Scan # | Start Pos. (mm) | End Pos. (mm) | Remarks |
|---|---|---|---|---|
| Patch Width (mm): 5 | 1 | 152 | 156.2 | Takes 6.9 sec. |
| Patch Ht. (mm): 10 | 2 | 153 | 156.3 | |
| Num. Patches: 13 | 3 | 154 | 156.3 | |
| Speed (mm/s): 3000 | 4 | 155 | 156.3 | |
| Scan Range (mm): +/−5 | 5 | 156 | 156.4 | |
| Page Len (mm): 635 | 6 | 157 | 156.4 | |
| | 7 | 158 | 156.3 | |
| | 8 | 159 | 156.3 | |
| | 9 | 160 | 156.3 | |
| | 10 | 161 | 156.2 | |
| | Std. Dev | | 0.0667 | |

TABLE 7

TABLE 7 TRIAL# 7

| | Scan # | Start Pos. (mm) | End Pos. (mm) | Remarks |
|---|---|---|---|---|
| Patch Width (mm): 5 | 1 | 152 | 156.3 | Takes 6.3 sec. |
| Patch Ht. (mm): 10 | 2 | 153 | 156.3 | |
| Num. Patches: 13 | 3 | 154 | 156.4 | |
| Speed (mm/s): 3500 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.3 | |
| | 10 | 161 | 156.3 | |
| | Std. Dev | | 0.0516 | |

TABLE 8

TABLE 8 TRIAL# 8

| | Scan # | Start Pos. (mm) | End Pos. (mm) | Remarks |
|---|---|---|---|---|
| Patch Width (mm): 5 | 1 | 152 | 156.3 | Takes 5.5 sec. |
| Patch Ht. (mm): 10 | 2 | 153 | 156.4 | |
| Num. Patches: 13 | 3 | 154 | 156.4 | |
| Speed (mm/s): 4000 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.4 | |
| | 9 | 160 | 156.4 | |
| | 10 | 161 | 156.3 | |
| | Std. Dev | | 0.0422 | |

TABLE 9

TABLE 9 TRIAL# 9

| | Scan # | Start Pos. (mm) | End Pos. (mm) | Remarks |
|---|---|---|---|---|
| Patch Width (mm): 5 | 1 | 152 | 156.3 | Takes 5.3 sec. |
| Patch Ht. (mm): 10 | 2 | 153 | 156.3 | |
| Num. Patches: 13 | 3 | 154 | 156.4 | |
| Speed (mm/s): 4500 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.3 | |
| | 8 | 159 | 156.3 | |
| | 9 | 160 | 156.3 | |
| | 10 | 161 | 156.3 | |
| | Std. Dev | | 0.0516 | |

TABLE 10

TABLE 10 TRIAL# 10

| | Scan # | Start Pos. (mm) | End Pos. (mm) | Remarks |
|---|---|---|---|---|
| Patch Width (mm): 5 | 1 | 152 | 156.3 | Takes 5.0 sec. |
| Patch Ht. (mm): 10 | 2 | 153 | 156.4 | |
| Num. Patches: 13 | 3 | 154 | 156.4 | |
| Speed (mm/s): 5000 | 4 | 155 | 156.4 | |
| Scan Range (mm): +/−5 | 5 | 156 | 156.4 | |
| Page Len (mm): 635 | 6 | 157 | 156.4 | |
| | 7 | 158 | 156.4 | |
| | 8 | 159 | 156.3 | |
| | 9 | 160 | 156.3 | |
| | 10 | 161 | 156.3 | |
| | Std. Dev | | 0.0516 | |

Figure 4:
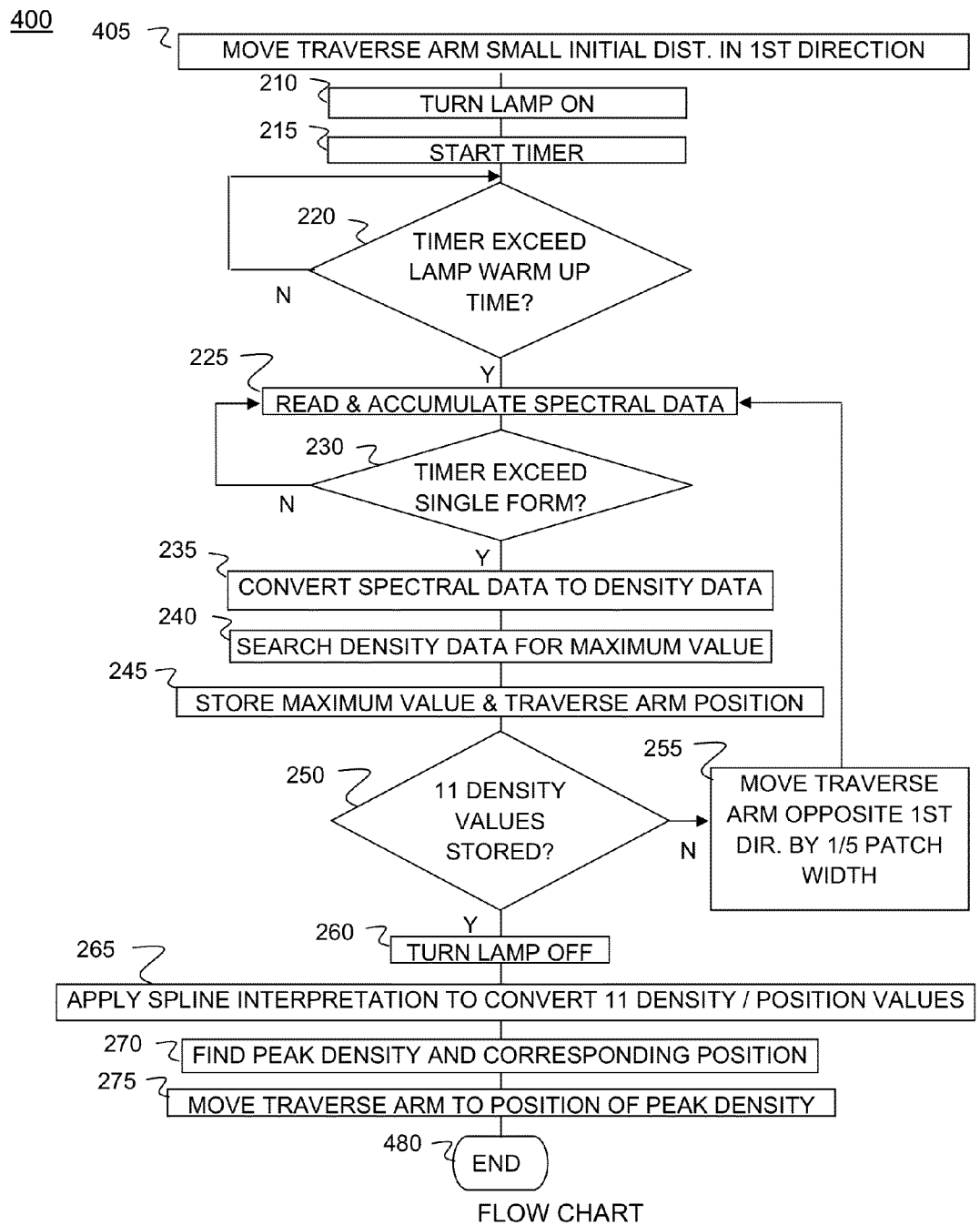
FIG. 4 is a third flow chart illustrating the self alignment process configured in accordance with an embodiment.

FIG. 4 is a flow chart 400 of another embodiment of the invention method illustrating the self alignment process. When the spectrophotometer receives the "self-align" command, it sends a command, such as via RS485 signal, to the traverse arm, to move a distance equivalent to the patch width laterally in a first direction (to the right, for example) of its current position quickly (>=300 mm/sec) 405. The spectrophotometer requests the current lateral position of the traverse arm and stores it as a digital value, such as "traverseStart_mm". The spectrophotometer turns on its lamp 410, and lamp timer is started 415, and waits for the lamp to warm up (0.5 seconds) 420. The spectrophotometer takes a series of discrete measurements 425, each of a duration equivalent to the time it takes a single form (or "page") of the printed patches to pass under the spectrophotometer 430. After each measurement finishes, the spectral data is converted to a list of density values 435. The list is searched for a maximum density 440 and is stored along with the current position of the traverse arm 445. If 11 density values have been stored 450, the spectrophotometer moves the traverse arm laterally in a direction opposite the first direction (to the left, for example), quickly (>=300 mm/s) by a small distance, such as ⅓ of a patch width 455. As mentioned, this sequence of taking a measurement and moving the traverse arm by a small distance repeats until a total of eleven measurements have been taken, each associated with a precise traverse arm position (precision=0.1 mm) 450. The lamp is turned off 460. At this point the spectrophotometer has 11 data points, each representing a pair of position/density values. These data points are interpolated using, in embodiments, a cubic spline algorithm to generate data of higher precision 465. Other embodiments use piecewise linear interpolation. After the cubic spline is applied, the data points are searched for maximum density value and the position associated with that value is considered the best lateral position for the spectrophotometer, for example, "bestPos_mm" 470. If multiple adjacent points have the same maximum density value (i.e. a "plateau" is detected) the position associated with the center of the plateau is designated "bestPos_mm". The spectrophotometer then sends the traverse arm a command to move to position "bestPos_mm" quickly (>=300 mm/s) 475. At this point, the spectrophotometer should be laterally positioned such that its aperture is optimally aligned with the color patches. Time duration for this process varies depending on page length and media speed, but should stay within the range of 3-60 seconds and a cycle ends 480. In examples, the PC then periodically commands the controller to repeat the self alignment process every 10 minutes (or as selected), so as to maintain spectrophotometer alignment with the color patches even if they move during the printing process.

In embodiments, alignment comprises storing the two "half max" point locations and the slope of the "shoulders" from the original scan. "Re-alignment" measures those two points again, and if an imbalance is found, it estimates the movement necessary to remove the error.

For embodiments, after the cubic spline step, if the maximum occurs off to one side of the center of patch (due to lack of uniformity). Positioning is based on the "shoulders". Given that the underlying profile is trapezoidal, the center of patch is determined from the center of the two "half of maximum" points.

Figure 5:
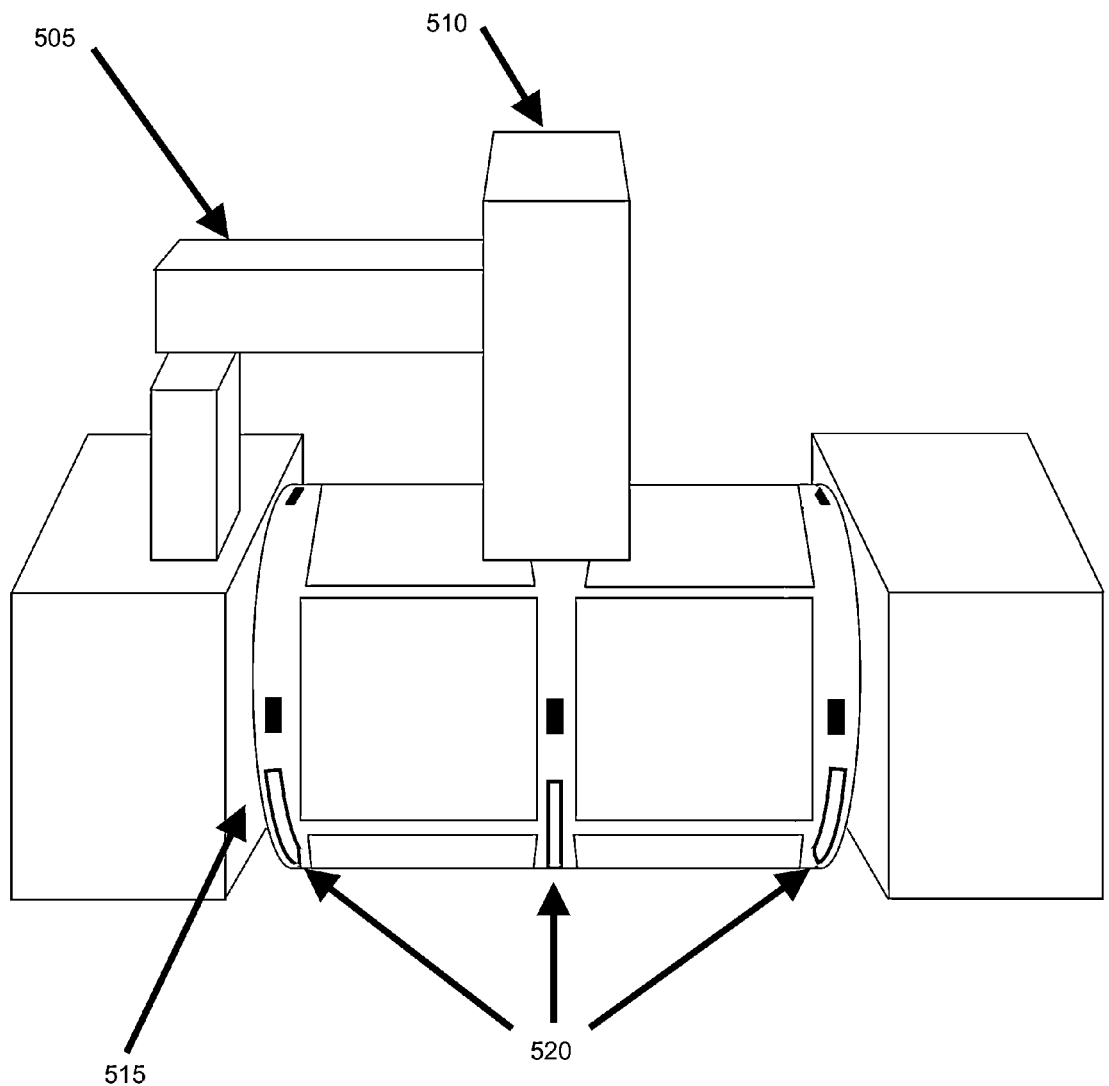
FIG. 5 is a simplified representation of equipment setup configured in accordance with an embodiment.

FIG. 5 is a simplified representation of an embodiment of equipment setup 500. Traverse mechanism 505 has spectrophotometer 510 affixed to it. Print media 515 comprises color patches 520.

Figure 6:
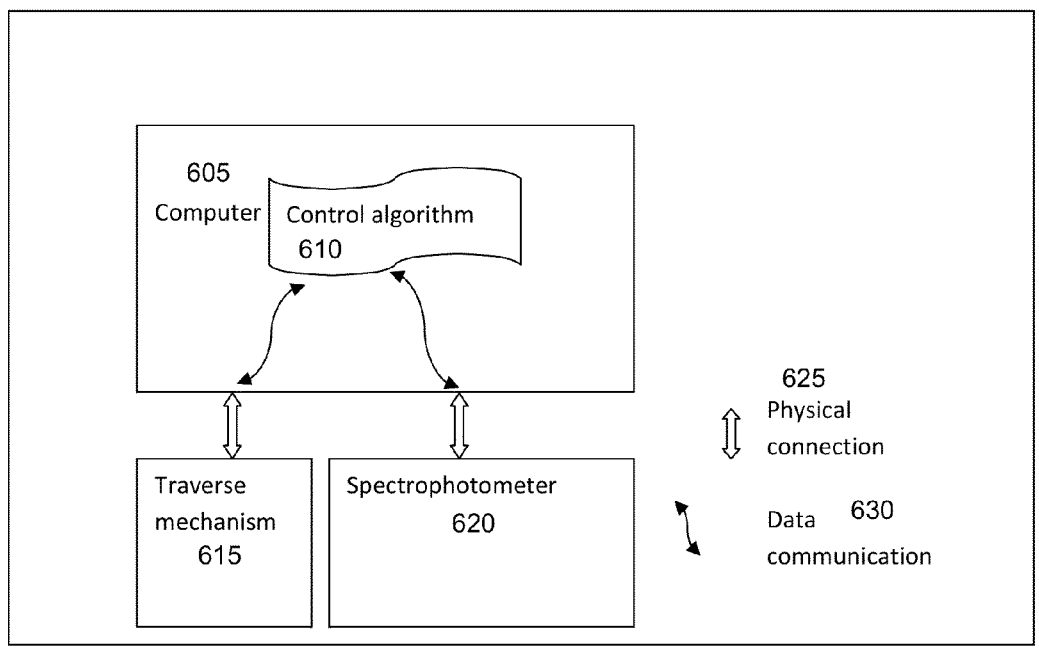
FIG. 6 illustrates control algorithm execution on host computer configured in accordance with an embodiment.

FIG. 6 illustrates control algorithm execution embodiment 600 on a host computer for physical partitioning showing physical connections and data connections. Host computer 605 comprises control algorithm 610. Control algorithm 610 interfaces with traverse mechanism 615 and spectrophotometer 620. Interfaces between computer 605, traverse mechanism 615, and spectrophotometer 620 comprise physical connection 625 and data communication 630.

Figure 7:
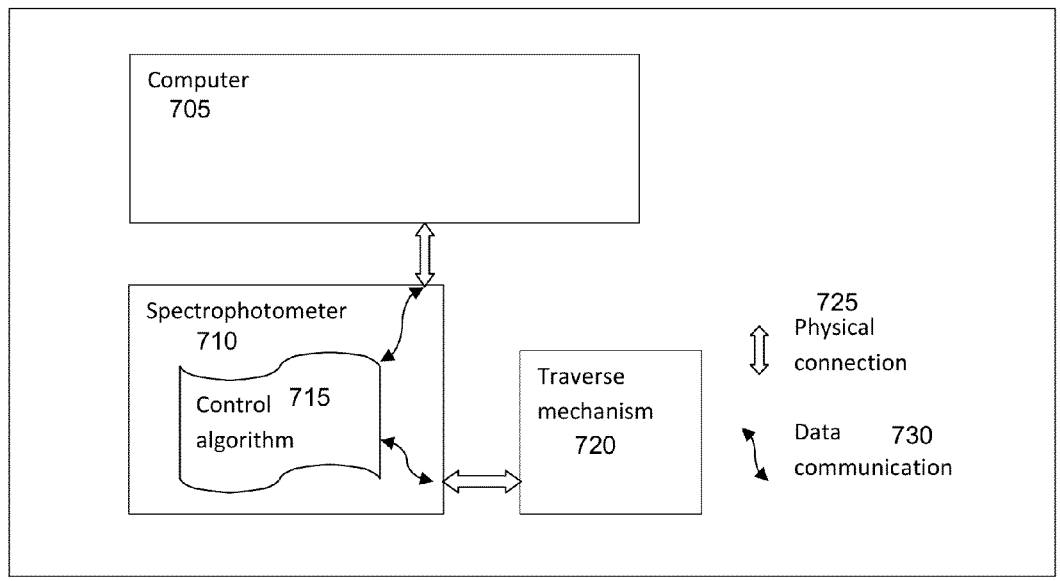
FIG. 7 illustrates control algorithm execution on intelligent spectrophotometer configured in accordance with an embodiment.

FIG. 7 illustrates control algorithm execution embodiment 700 on an intelligent spectrophotometer for physical partitioning showing physical connections and data connections. Computer 705 interfaces with spectrophotometer 710 which comprises control algorithm 715. Spectrophotometer 710 interfaces with traverse mechanism 720. In embodiments, traverse mechanism 720 does not directly interface with computer 705. Interfaces between computer 705 and spectrophotometer 710 and spectrophotometer 710 and traverse mechanism 720 comprise physical connection(s) 725 and data communication(s) 730.

Figure 8:
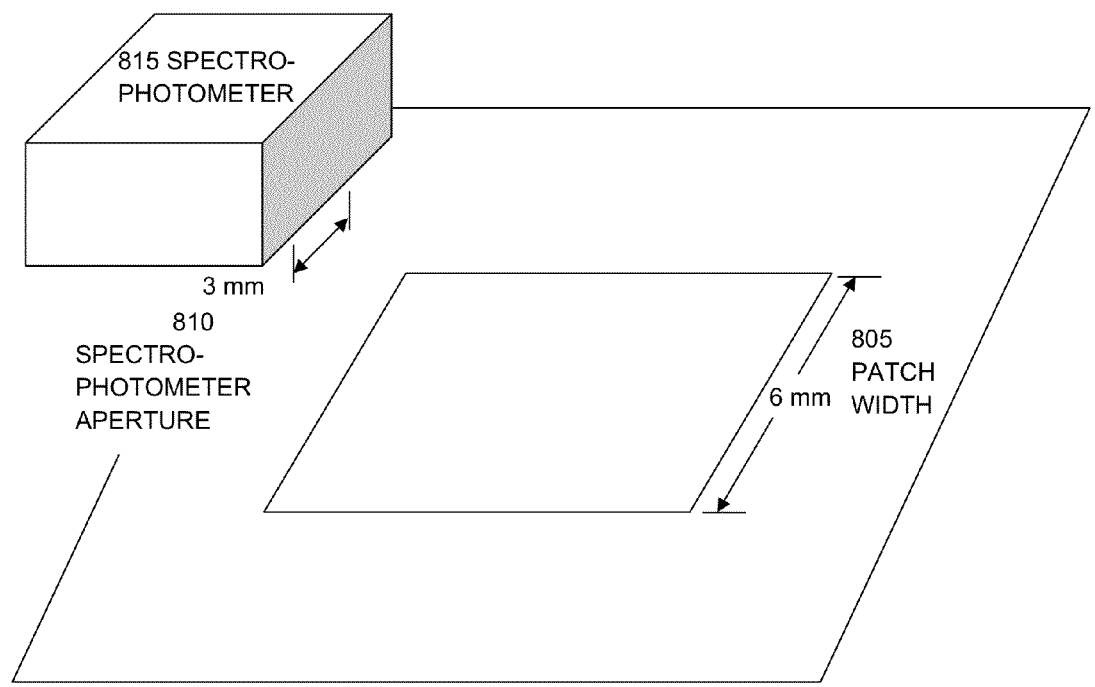
FIG. 8 illustrates the width of the patch and the width of the measuring aperture configured in accordance with an embodiment.

FIG. 8 illustrates (not to scale) 800 the width of the patch 805 (in embodiments, 6 mm) and the width of the measuring aperture 810 (in embodiments, 3 mm) of spectrophotometer 815. The depiction illustrates the left/right shoulder calculation embodiments. For these example dimensions, there is a +/−1.5 mm margin for centering the spot/patch. The half way between the shoulders places the read aperture right in the middle which provides the best accommodation of variation as the press runs.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for computer automated optimal lateral alignment of a spectrophotometer over calibration regions on printed materials of a moving web press for maintaining consistent qualities of a color application process comprising the steps of:
   moving a traverse arm in an initial first direction;
   reporting, with said spectrophotometer, representative spectral data from specific regions of interest;
   converting spectral data to at least one metric;
   storing, with position data, said at least one metric;
   moving said traverse arm in a direction opposite said first direction by 1/N width of said patch;
   applying mathematic interpolation to convert 2N+1 values for said metric and said position to 20N+1 metric values that are equally spaced across a range of said measured positions;
   finding an attribute of said metric and corresponding said position;
   moving said traverse arm to said position of said attribute of said metric.

2. The method of claim 1 comprising manually adjusting said spectrophotometer on a lateral traverse system to be approximately over said regions in a margin of said printed materials.

3. The method of claim 1, comprising, at a system start-up, a controller commanding said traverse arm to scan said spectrophotometer laterally across an entire width of said web press until said region is located at a point of maximum metric; and
   positioning said spectrophotometer at said location.

4. The method of claim 1, comprising a control algorithm operating on a host.

5. The method of claim 1, comprising a control algorithm operating on said spectrophotometer.

6. The method of claim 1, wherein N=5.

7. The method of claim 1, wherein said attribute comprises a center of said region of interest determined by finding a peak metric value in said interpolated data set.

8. The method of claim 1, wherein said attribute comprises a center of said region of interest determined by finding a center point between two shoulders in said interpolated data set.

9. The method of claim 1, wherein an initial position is estimated by a predicted position of a location of a region in a printed image.

10. A method for automatic lateral self alignment of a spectrophotometer over a color patch on a medium on a web-press comprising the steps of:
   receiving, at said spectrophotometer, a self-align command;
   said spectrophotometer consequently sending a command to a traverse arm, whereby said spectrophotometer moves a distance of a width of said color patch laterally in a first direction at at least about 300 mm/second;
   requesting, by said spectrophotometer, a current lateral position of said traverse arm;
   storing said position as a digital value;
   turning on, by said spectrophotometer, a lamp of said spectrophotometer;
   starting a lamp timer;
   waiting for said lamp to warm up;
   turning on, by said spectrophotometer, light reflectance data acquisition;
   taking, by said spectrophotometer, a series of discrete measurements, each of a duration equivalent to a time it takes a single page of said color patches to pass under said spectrophotometer;
   after each measurement finishes, said spectral data is converted to a list of density values;
   searching said list for a maximum density;
   storing said density values with current said position of the traverse arm;
   if eleven density values have been stored, said spectrophotometer moves said traverse arm laterally in a direction opposite said first direction at at least about 300 mm/s by about ⅕ a width of said patch;
   repeating said measurements until a total of eleven measurements have been taken, each associated with a traverse arm position precision of about 0.1 mm;
   turning off said light reflectance data acquisition;
   turning off said lamp;
   interpolating said data using a cubic spline algorithm to generate data of higher precision;
   searching said data points for a maximum density value and a position associated with said maximum value and designating said position a best lateral position for said spectrophotometer;
   associating said best lateral position with a center position of multiple adjacent points if said multiple adjacent points have about a same maximum density value;
   sending, by said spectrophotometer, said traverse arm a command to move to said best lateral position at a speed of greater than about 300 mm/s;
   whereby said spectrophotometer is laterally positioned such that its aperture is optimally aligned with said color patches;
   repeating said self alignment process about every 10 minutes, so as to maintain alignment of said spectrophotometer with said color patches.

* * * * *